(12) United States Patent
Ostrander et al.

(10) Patent No.: US 6,805,383 B2
(45) Date of Patent: Oct. 19, 2004

(54) FLUID QUICK CONNECTOR WITH SECURE ELECTRICAL CONTACT

(75) Inventors: James E. Ostrander, Rochester, MI (US); Rick C. Kelley, Auburn Hills, MI (US); George Szabo, Ortonville, MI (US); Darrell Wilczynski, Oxford, MI (US); Kevin Kreiner, North Branch, MI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/010,294

(22) Filed: Nov. 12, 2001

(65) Prior Publication Data

US 2003/0090109 A1 May 15, 2003

(51) Int. Cl.[7] ............................................. F16L 37/00
(52) U.S. Cl. .................... 285/305; 285/319; 285/149.1; 439/208; 439/210
(58) Field of Search ............................. 285/305, 319, 285/47, 149.1, 348; 439/207, 208, 210; 174/19, 24, 86

(56) References Cited

U.S. PATENT DOCUMENTS

| | | | | |
|---|---|---|---|---|
| 4,165,910 A | * | 8/1979 | Anderson | 439/318 |
| 4,181,329 A | * | 1/1980 | Helm | 285/305 |
| 4,549,755 A | * | 10/1985 | Kot et al. | 285/341 |
| 4,613,172 A | * | 9/1986 | Schattmaier | 285/340 |
| 4,948,180 A | * | 8/1990 | Usui et al. | 285/319 |
| 5,059,747 A | | 10/1991 | Bawa et al. | 174/65 |
| 5,076,920 A | | 12/1991 | Danowski et al. | 210/243 |
| 5,164,879 A | | 11/1992 | Danowski et al. | 361/215 |
| 5,468,027 A | * | 11/1995 | Guest | 285/319 |
| 5,524,673 A | | 6/1996 | Noone et al. | 138/103 |
| 5,743,304 A | | 4/1998 | Mitchell et al. | 138/137 |
| 5,792,990 A | * | 8/1998 | Piero | 174/86 |
| 5,951,063 A | | 9/1999 | Szabo | 285/303 |
| 5,988,706 A | * | 11/1999 | Hollnagel | 285/319 |
| 6,027,143 A | * | 2/2000 | Berg et al. | 285/305 |
| 6,152,496 A | * | 11/2000 | Kouda | 285/319 |
| 6,402,205 B1 | * | 6/2002 | Rose et al. | 285/319 |
| 6,499,771 B1 | * | 12/2002 | Snyder et al. | 285/319 |

FOREIGN PATENT DOCUMENTS

| | | | | |
|---|---|---|---|---|
| GB | 824 833 A | | 12/1959 | |
| GB | 1 565 530 A | | 4/1980 | |
| GB | 2095780 | * | 10/1982 | 285/305 |

* cited by examiner

Primary Examiner—David Bochna
(74) Attorney, Agent, or Firm—Young & Basile, P.C.

(57) ABSTRACT

A quick connector includes a connector housing having a through bore adapted to mate with an endform. An electrical contact is mountable in the bore of the connector housing and includes contact members in the form of projections to provide a secure electrical connection between the endform and the connector housing when the male endform is mounted in the connector housing. In one aspect, the electrical contact is formed as the spacer or top hat in the quick connector housing.

23 Claims, 3 Drawing Sheets

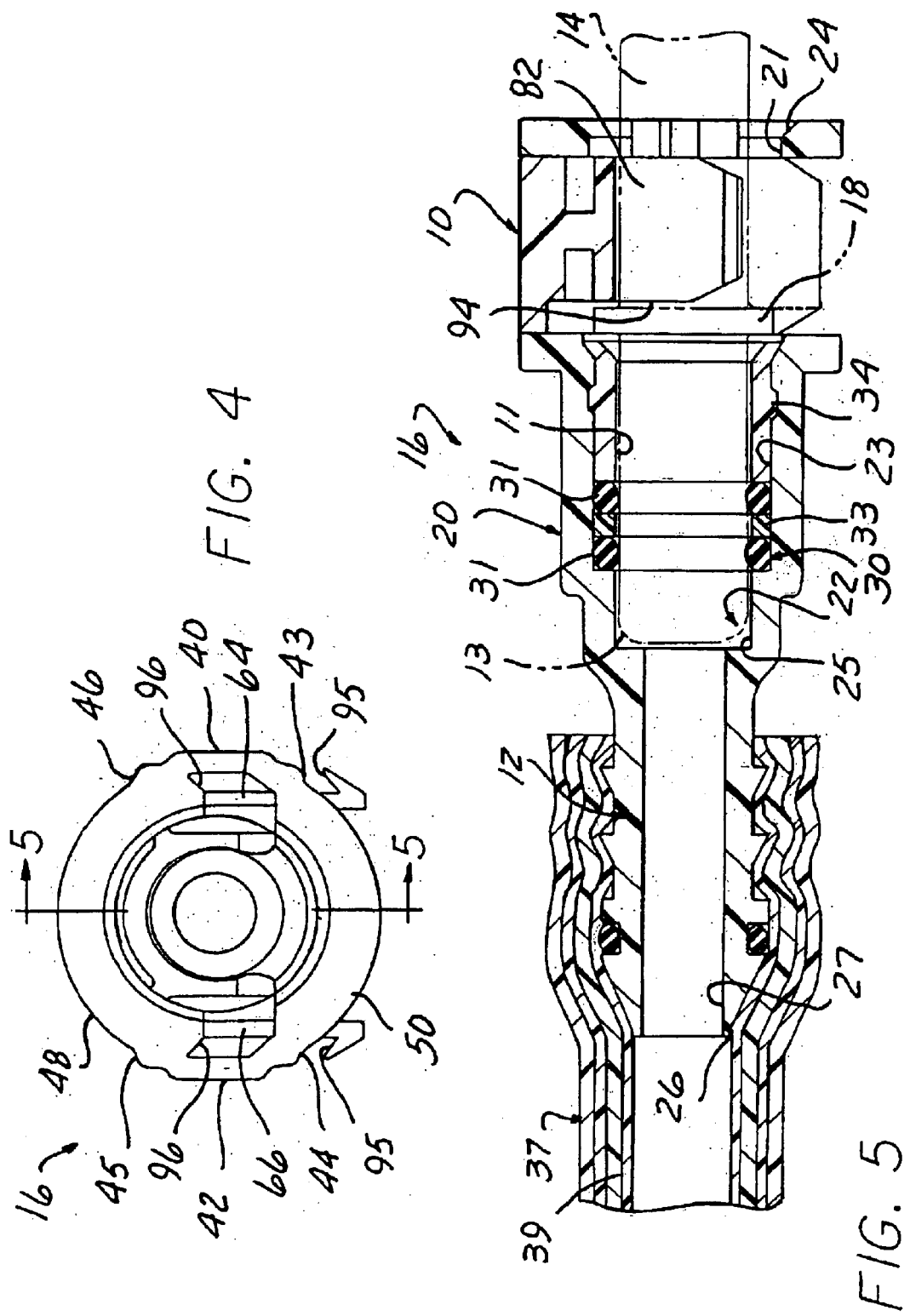

FLUID QUICK CONNECTOR WITH SECURE ELECTRICAL CONTACT

BACKGROUND OF THE INVENTION

The present invention relates, in general, to fluid quick connectors which couple male and female connector components.

Snap-fit or quick connectors are employed in a wide range of applications, particularly, for joining fluid carrying conduits in automotive and industrial application. Such quick connectors utilize retainers or locking elements for securing a male connector component, such as a tubular conduit, within a complimentary bore of a female connector component or housing. Such retainers are typically of either the axially-displaceable or radially-displaceable type. The terms "axially-displaceable" or "radially-displaceable" are taken relative to the axial bore through the female component.

In a typical quick connector with an axially displaceable, retainer, the retainer is mounted within a bore in a housing of the female connector component of housing. The retainer has a plurality of radially and angularly extending legs which extend inwardly toward the axial center line of the bore in the housing. A tube or male component to be sealingly mounted in the bore in the female component includes a radially upset portion or flange which abuts an inner peripheral surface of the retainer legs. Seal and spacer members as well as a bearing or top hat are typically mounted in the bore ahead of the retainer to form a seal between the housing and the male fitting when the male fitting is lockingly engaged with the retainer legs in the housing.

Radially displaceable retainers are also known in which the retainer is radially displaceable through aligned bores or apertures formed transversely to the main throughbore in the female component housing. The radially displaceable retainer is typically provided with a pair of depending legs which are sized and positioned to slip behind the radially upset portion or flange on the male conduit only when the male connector or conduit is fully seated in the bore in the female component. This ensures a positive locking engagement of the conduit with the female component as well as providing an indication that the conduit is fully seated since the radially displaceable retainer can be fully inserted into the female component only when the conduit has been fully inserted into the bore in the female component.

Regardless of the type of retainer, the female housing or component portion of a fluid connector typically includes an elongated stem having one or more annular barbs spaced from a first end. The barbs provide secure engagement with a hose or conduit which is forced over the barbs to connect the female housing with one end of the conduit.

In certain fluid flow applications, such as vehicle fuel delivery systems, the fast flowing fuel creates a static electric charge which must be dissipated to minimize the danger of explosion. Multi-layer tubes containing an internal electrically conductive layer have been provided for conducting any static charge buildup to an electrical ground connection to thereby dissipate the static charge. In such applications, the housing of quick connectors have been formed with conductive materials to complete a static charge conductive path between the conductive layer in the multi-layer tube connected to one end of the housing and the typically metal or conductive plastic male endform or conduit inserted into the other end of the connector housing.

However, a reliable, continual contact between the endforms and the inner surfaces of the conductive quick connect housing is not always possible due to manufacturing tolerances. This results in intermittent electrical contact which can lead to built up static electricity in the fuel system which, in turn, increases the opportunity for an explosion.

Thus, it would be desirable to provide a quick connector which maintains secure electrical contact with an internally received electrically conductive endform.

SUMMARY OF THE INVENTION

The present invention is a fluid quick connector with an electrical contact which provides a secure electrical connection between a mated connector body and male endform.

In one aspect, the fluid quick connector is formed of a connector housing having through bore adapted to mate with a male endform. A retainer locks the male endform in the connector housing.

A seal assembly includes at least one of an O-ring, a spacer and/or a top hat which are disposed in the bore of the connector housing to seal the male endform to the connector body.

The electrical contact is provided in the quick connector as a separate element in the bore of the connector housing, such as on one of the spacer or the top hat to provide a secure electrical connection between the male endform and the connector housing when the male endform is mounted in the bore in the connector housing. The contact includes a contact member in the form of a radially inward extending projection carried on an inner surface of the separate element, such as the spacer or the top hat which is adapted to engage an outer surface of the male endform. Since the electrical contact is formed of an electrically conductive material and fixed in position in the connector housing, the electrical contact provides a secure electrical connection between the conductive male endform and the conductive connector housing to form an electrical path to dissipate static electric charge which may build up in the fuel system due to fluid flowing through aligned bores in the male endform and the connector body.

The contact member is at least one projection and, preferably, is plurality of circumferentially spaced projections carried or integrally formed on an inner surface of contacts, such as on the spacer or top hat. An inner end of each projection is disposed at a diameter with respect to the ends of other projections or the surrounding bore in the connector housing which is substantially equal to or slightly greater than the outer diameter of the tip end of the male endform. This insures secure contact between the contact member and the male endform.

The fluid quick connector with the unique electrical contact of the present invention provides a secure electrically conductive path through the quick connector to a remote ground which has heretofore not been continually available fluid in quick connectors. The conductive path is formed by contact members carried on or integrally formed on the contact, such as on the spacer or top hat components in the quick connector. This eliminates the need for additional components to provide the electrically conductive path between the male endform and the connector housing so as to minimize manufacturing costs. Further, the contact member is disposed so as to provide a wiping action when the male endform is inserted into the bore in the connector housing to provide the desired secure, continuous electrical contact between the male endform and the surrounding connector housing. This conductive path finds advantageous use with conduits or multi-layer tubes having an inner electric charge dissipative layer. When such conduits or tubes are fixedly mounted on one end of the connector housing, the inner electric charge dissipative layer is disposed in contact with the conductive connector housing thereby insuring a continuous conductive pathway to ground through the male endform, the connector housing and the conduit or tube.

BRIEF DESCRIPTION OF THE DRAWING

The various features, advantages and other uses of the present invention will become more apparent by referring to the following detailed description and drawing in which:

FIG. 4 is an end view of the quick connector and retainer, with the retainer depicted in a fully inserted, position in the female component;

FIG. 5 is a cross sectional view generally taken along line 5—5 in FIG. 4;

DETAILED DESCRIPTION

Figure 1:
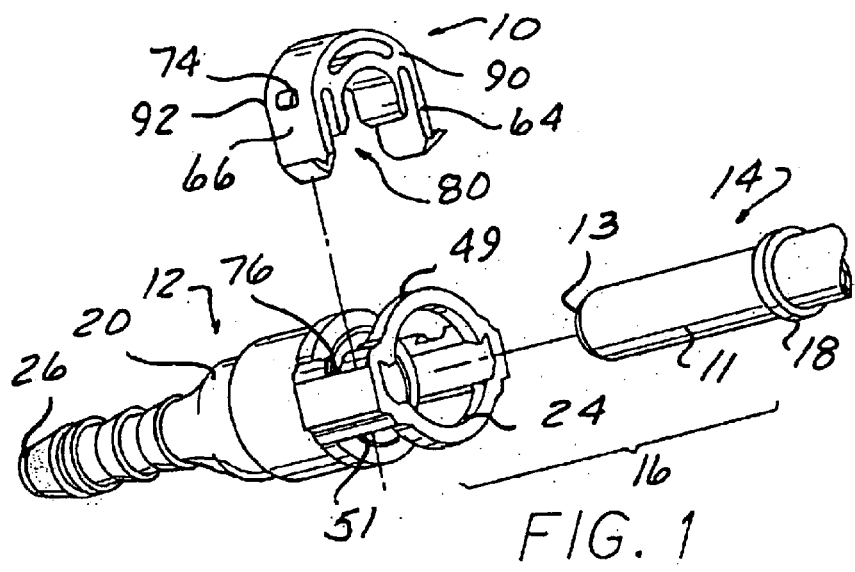
FIG. 1 is an exploded, perspective view of a quick connector using the electrical contact according to the present invention.

For clarity in understanding the use and operation of the present invention, reference will first be had to FIGS. 1–5 which depict a retainer 10 which lockingly couples female and male components 12 and 14, respectively, of a fluid quick connector 16.

The following description of the female connector component or element 12 is by way of example only as the female connector component 12 may have any suitable shape typically found in quick connectors.

Further, the following description of the use of the fluid quick connector to connect tubular members will be understood to apply to the connection of conduits, hoses, and/or solid metal or plastic tubes to each other in fluid flow communication. The end of a conduit or tubular member inserted into the interior of one end of the quick connect will be defined as an endform. The endform can be a separate member which receives a separate hose or conduit at one end or a shape integrally formed on the end of an elongated metal or plastic tube. Further, the endform can be integrally formed on or mounted as a separate element to a fluid use device, such as a pump, filter, etc., rather than as part of an elongated conduit.

The present quick connector finds advantageous use with tubular members, such as conduits, tubes, or hoses which are capable of defining a continuous electrically conductive path through the tubular member itself or through a conductive layer or portion of the tubular member. For example, conductive layers have been provided in multi-layer tubes as disclosed in U.S. Pat. Nos. 5,524,673, and 5,743,304. Reference is made to these conductive layers which provide an electrically conductive path from the quick connector of the present invention to a remote electrical ground to dissipate static electric charges which can build up within the fuel system due to fast flowing fluids, such as vehicle fuels.

The female component 12 includes a housing 20 having an elongated, axially extending, internal stepped bore 22, shown in detail in FIG. 5, extending from a large diameter first, open end 24 to a smaller diameter, second open end 26. The stepped bore 22 includes a first bore portion 21 extending from an opening at the first end 24 of the housing 20 to a second smaller diameter second stepped bore portion 23. A third yet smaller diameter stepped bore portion 25 extends axially from one end of the second stepped bore portion 23 and communicates to a still smaller fourth stepped bore portion 27 which extends to the open second end 26 of the housing 20.

As is conventional, a top hat or bearing 34 is mounted in the second stepped bore portion 23 immediately adjacent the end of the first bore portion 21. A seal means 30 is also mounted in the second stepped bore portion 23 between one end of the top hat 34 and the third stepped bore portion 25.

The inner diameter of the first stepped bore portion 21 is sized to slidably receive the outer diameter of the radially enlarged flange or upset bead 18 formed on the male component or fitting 14. Further, the inner diameters of the seal means 30 and the top hat 34 are sized to sealingly engage the outer diameter of the end portion 11 of the male component 14 extending from the radially enlarged flange 18 to the tip end 13 of the male component 14. The third stepped bore portion 25 has an inner diameter sized to snugly engage the outer diameter of the end portion 11 of the male component 14 when the male component 14 is fully inserted into the stepped bore 22 as described hereafter. The seal means 30 is formed, by example, of at least one and preferably two o-rings 31 which are separated by a rigid, annular spacer 33.

Figure 3:
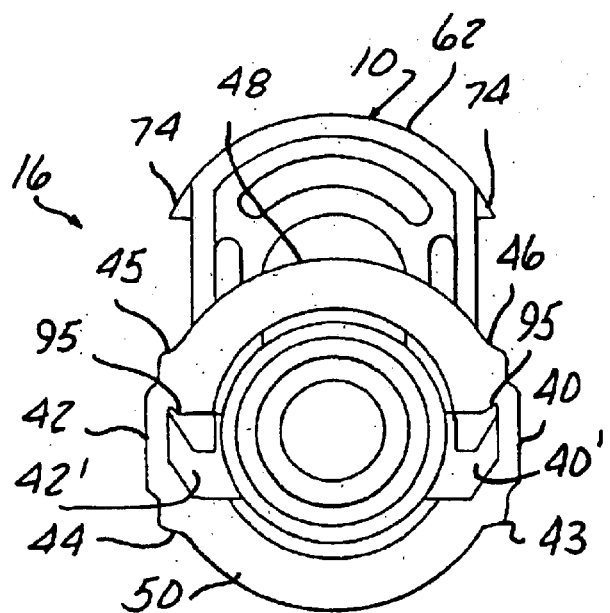
FIG. 3 is an end view of the quick connector and retainer, with the retainer shown in a partially inserted, storage position.

As shown in FIGS. 1, 3, and 4, the first end 24 of the housing 12 is formed with a pair of opposed, exterior flat surfaces 40 and 42. The flat surfaces 40 and 42 are diametrically opposed on the first end 24 and may be centrally located on each diametrical side of the first end 24. The adjacent surfaces of the housing 20 to one side of the flat surfaces 40 and 42 form an opposed pair of lock surfaces or flats, such as a first flat 43 and a second flat 44. A second pair of flats 45 and 46 are formed on the housing 12 or the other side of the flat surfaces 40 and 42. The flats 43 and 44 extend axially a short distance from the first end 24 of the housing 20. Opposed surfaces 48 and 50 of the first end 24 of the housing 20 between the flats 43 and 44 and the flats 45 and 46 have a generally arcuate shape as shown in FIGS. 3 and 4. Apertures 49 and 51 are formed respectively in each surface 48 and 50. The apertures 49 and 51 are aligned to form a transverse bore extending through the first end 24 of the housing 20 which is disposed in communication with the first bore portion 21 in the housing 20.

The retainer 10, described hereafter, is by way of example only as other radially-displaceable retainer designs having side locking projections may also employ the release tool of the present invention. Alternately, the housing 12 can be reconfigured to receive an axial-type retainer.

The retainer 10 is formed of a one-piece body of a suitable plastic, such as polyketone, for example, and has an end wall 62 formed of a generally curved or arcuate shape, by way of example only, and first and second spaced side legs 64 and 66. The side legs 64 and 66 extend generally parallel to each other from opposite ends of the end wall 62. Further, each side leg 64 and 66 has an outer end 72, although it is also possible to connect the side legs 64 and 66 at a lower portion by an arcuate member.

A pair of projections 70 extend along the length of the retainer 10 between opposed side edges of the side legs 64 and 66, respectively. The projections 70 are located adjacent the outer end 72 of each leg 64 and 66. The projections 70 engage surfaces on the housing 12 to position the retainer 10 in the shipping position shown in FIG. 3, or in the fully inserted, latched position shown in FIGS. 4 and 5.

Further, a pair of outward extending lock tabs or edges 74 are formed adjacent the end wall 62 on each side leg 64 and 66.

As shown in FIGS. 1–5, the retainer 10 includes a radially flange receiving means 80 which is preferably carried as an integral, one-piece part of the retainer 10. The radial flange receiving means 80 includes first and second depending arms 82 and 84 which extend from a boss or enlargement 86 integrally formed on the inner surface of the end wall 62 of the retainer 10. An inverted, U-shaped slot 88 is formed on the inner surfaces of the arms 82 and 84 and the boss 86 which is sized to snugly conform to the outer diameter of the tubular portion 11 of the male component 14. The outer ends 91 of each of the arms 82 and 84 are angled or tapered to act as a guide surface to assist in sliding movement of the arms 82 and 84 over the tubular end 11 of the male component 14.

Figure 2:
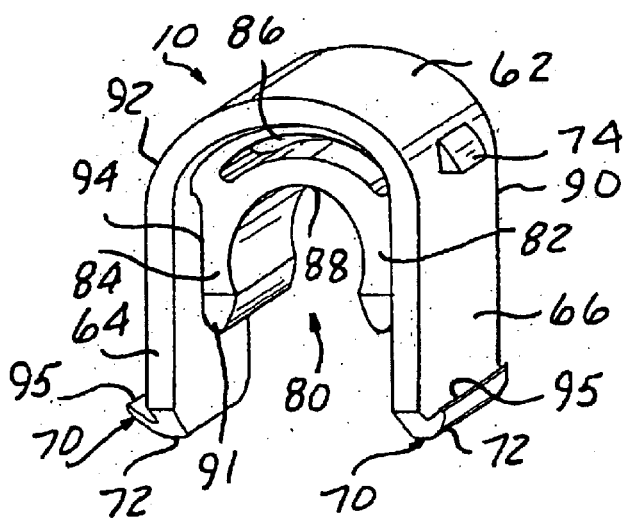
FIG. 2 is an enlarged, left end, perspective view of the retainer shown in FIG. 1.

As shown in FIGS. 1 and 2, each of the arms 82 and 84 extends from one side end contiguous with a first side end 90 of the retainer 10 to an opposed side end contiguous with a second side end 92 of the retainer 10.

As shown in FIGS. 1, 2, 3 and 4, the projections 70 on the legs 64 and 66 of the retainer 10 are formed with an angled hook-like shape terminating in a tip 95. The tip 95 is disposed at an acute, upturned angle with respect to the corresponding legs 64 and 66.

Figure 6:
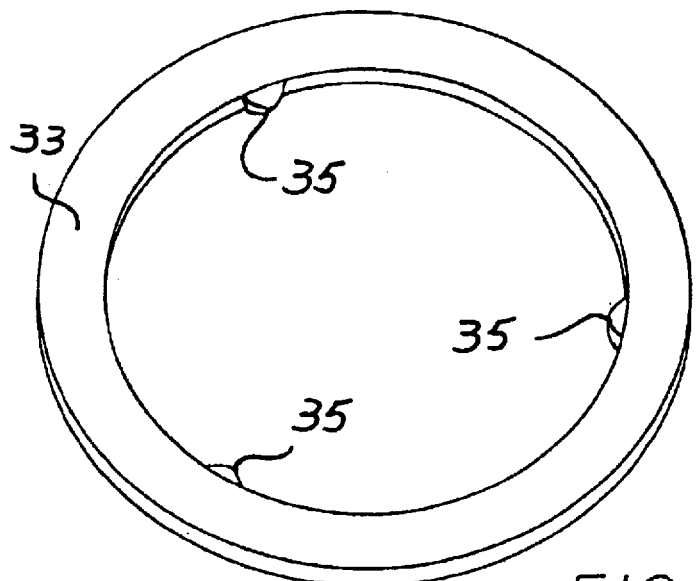
FIG. 6 is a perspective view of the electrical contact in the form of a spacer according to one aspect of the present invention.

Similarly, as shown in FIGS. 3 and 4, and in greater detail in FIG. 6, the grooves 40' and 42' are formed in the interior of the flat surfaces 40 and 42, respectively, and include a recess or notch 96 at one end which is shaped complimentary to the shape of the tip 95 of the projection 70 on each of the legs 64 and 66 of the retainer 10. In this manner, pull out of the retainer 10 from the housing 12 is resisted by the interlocking tips 95 on the legs 64 and 66 of the retainer 10 which are seated within the notches 96 in the grooves 40' and 42' in the housing 12 as shown in the partially inserted, shipping position of the retainer 10 in FIG. 3. The flats or lock edges 44 and 46 are disposed at an angle complimentary to the acute angle of the tips 95 on the legs 64 and 66 of the retainer 10. This enables interlock of the tips 95 with the flats 44 and 46 resists pull out of the retainer 10 from the housing 12 from the fully latched position shown in FIG. 4.

The hook shaped tips 95 on the legs 64 and 66 of the retainer 10 in conjunction with the grooves 40' and 42' in the housing 12 also provide, a distinct, "avalanche effect" snap action of the retainer 10 in the housing 12. The grooves 40' and 42' in the housing 12 are formed in generally planar flat surfaces. The inner surfaces force the ends 72 of the legs 64 and 66 laterally inward toward each other when the retainer 10 is inserted into the housing 12. When the tips 95 clear one edge of the grooves 40' and 42', the resilient nature of the legs 64 and 66 snaps the ends 72 and the tips 95 laterally outward to create an "avalanche effect" which provides a distinct tactile feedback to the user indicating that the retainer has lockingly engaged the housing 12 in either the partially inserted position shown in FIG. 3 or the fully inserted position shown in FIG. 4.

It should be noted that further insertion force on the retainer 10 moving the retainer 10 from the partially inserted position shown in FIG. 3 to the fully inserted position shown in FIG. 4 again causes the end 72 of the legs 64 and 66 to be urged laterally inward when the tips 95 of the legs 64 and 66 slide along the lower portion of the inner surfaces. When the tips 95 clear the outer end of the inner surfaces, the legs 64 and 66 spring laterally outward in a distinct "avalanche effect" manner. The lower ends of the grooves 40' and 42' are angled to enable the tips 95 to slide out of the grooves 40' and 42' toward the fully latched position.

The retainer 10 can be first be installed on the housing 12 in a shipping or storage position as shown in FIG. 3. In this position, the projections 70 on the side legs 64 and 66 of the retainer 10 snap into and engage the longitudinally extending grooves 40' and 42'.

Further insertion of the retainer 10 through the aligned apertures 49 and 51 in the housing 12 causes the ends 72 of the legs 64 and 66 to pass along the lower portion of the inner surfaces of the flat surfaces 40 and 42 until the tips 95 clear the ends of the surfaces and then snap outward exteriorly of the outer surface of the first end 24 of the housing 12 as shown in FIG. 4. In this fully inserted position of the male component 14 in the female component 12, the annular flange 18 on the male component 14 is situated ahead the arms 82 and 84 of the retainer 10. This position represents the fully latched position in which the male component 14 is fully seated in and lockingly engaged with the female component 12. The full insertion of the retainer 10 into the housing 12 also provides visible indication of the fully locked connection of the male and female components 14 and 12, respectively.

It should be noted that if the male component 14 is not fully engaged or seated within the housing 12, the annular flange 18 on the male component 14 will not be properly situated within the transverse bore in the housing 12 to slidably receive the arms 82 and 84 in the retainer 10. If the annular flange 18 on the male component 14 is at any position other than shown in phantom in FIG. 5, the arms 82 and 84 on the retainer 10 will contact the annular flange 18. Since the spacing between the inner surfaces of the legs 82 and 84 is less than the outer diameter of the annular flange 18, the retainer 10 cannot be moved to the fully inserted position thereby providing an indication of an incomplete seating or mounting of the end portion 11 of the male component 14 in the housing 12.

According to one aspect of the present invention, which is shown in detail in FIG. 6, an electrical contact is disposed within the housing 20 of the female component 12 to provide a secure electrical contact between the conductive male component or endform 14 and the conductive female component 12. In this aspect, the housing 20 is electrically conductive, either by being formed of a conductive metal or, when formed of a plastic, being doped or filled with sufficient electrically conductive particles to render it conductive. Likewise, the male component 14, in this aspect, is also conductive by being made of a conductive metal or a plastic filled with sufficient conductive particles to render the entire male component 14 electrically conductive.

According to this aspect of the invention, the electrical contact is an element mountable in the bore portion 23 of the connector or housing 20. In one aspect, the contact is formed as the spacer 33, which is made of an electrically conductive material. The spacer 33 carries at least one and, preferably a plurality of contact members, such as projections 35 which are disposed on an inner edge of the spacer 33 and project radially inward into the bore in the housing 20. Three equi-circumferentially spaced projections 35 are shown by way of example only in FIG. 6.

The projections 35 may take any suitable shape such as the rounded or smoothly curved shape shown in FIG. 6. A pyramidal, polygonal, or other shape may also be employed for the projections 35.

The projections 35 are positioned to securely engage the outer surface of the tip end 13 of the male endform 14 when the male endform 14 is inserted into the housing 20. Since the spacer 33 is provided with an outer diameter substantially equal to the inner diameter of the stepped bore portion 23 in the housing 20, the spacer 33 is disposed in secure contact with the housing 20. In this manner, the spacer 33 and the projections 35 function as the contact member to provide a secure electrical connection between the male endform 14 and the housing 20 of the female component 12. This electrical connection insures a continuous electrically conductive path through the quick connector 16 which enables any static electrical charge generated by fluid flowing through the connector housing 20 to be dissipated through the quick connector 16 and any connected component, such as the aforementioned multi-layer tube 37 which is provided with an inner electrical charge dissipation conductive layer 39, as shown in FIG. 5.

Figure 8:
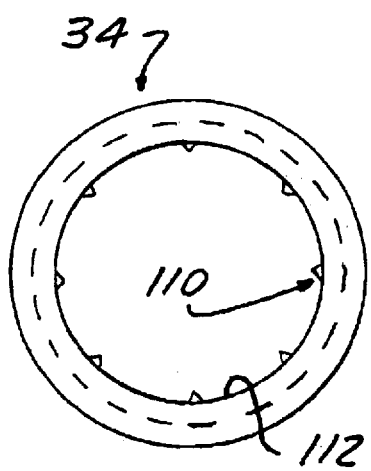
FIG. 8 is an end view of the top hat shown in FIG. 7.
Figure 7:
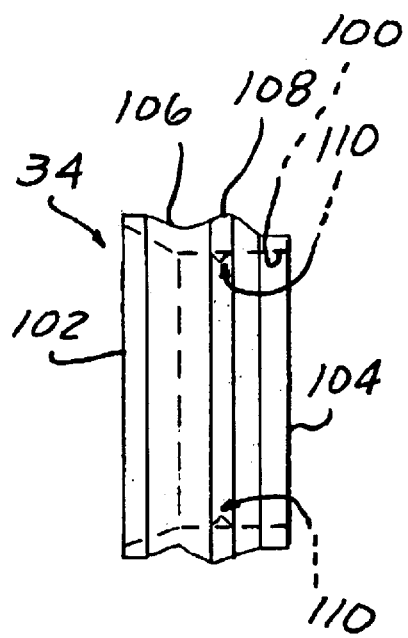
FIG. 7 is a side elevational view of a top hat electrical contact according to another aspect of present invention.
Figure 9:
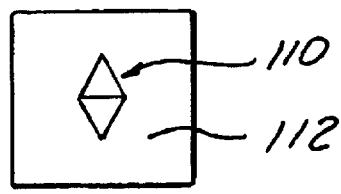
FIG. 9 is a partial, enlarged view of the projection on the top hat shown in FIGS. 7 and 8.

In another aspect of the present invention shown in FIGS. 7–9, the electrical contact is formed of the top hat 34.

In this aspect, the top hat 34, by example only, and as shown in FIGS. 7 and 8, is formed of a one-piece, electrically conductive body having a through bore 100 which extends from a tapered inlet at a first end 102 of the top hat 34 to an opposed second end 104. The exterior surface of the top hat 34 is formed with a first annular recess 106 which is adapted to engage a projection in the bore of the housing 20, and an adjacent raised or enlarged diameter annular portion 108 which is adapted to snap into a corresponding recess formed in the housing 20 as shown in FIG. 5 to lock the top hat 34 in the housing 20.

In this aspect, the contact member is formed as an integral part of the top hat 34 and is in the form of at least one and, preferably, a plurality of circumferentially spaced projections 110. By example only, three projections 110 are equi-circumferentially spaced about an inner surface 112 of the top hat 34 as shown in FIG. 8.

The projections 110 may have any shape, such as smoothly curved, polygonal. By example only, and as shown in detail in FIG. 9, each projection 110 has a generally pyramidal shape extending radially inward from the inner surface 112 of the top hat 34.

The projections 110 function in the same manner as the projections 35 in the previously described aspect of the invention in that the projections 110 are disposed in the path of insertion of the tip end 13 of the male endform 14 into the bore in the housing 20. The projections 110 have a height so as to securely engage the outer surface of the tip end of the male endform 14. Since the top hat 34 is lockingly mounted in the housing 20, as described above, the contact members 110 provide a secure electrical connection between the conductive male end form 14 and the conductive housing 20 of the female component 12.

What is claimed is:

1. A fluid quick connector comprising:
a connector housing configured to receive an endform;
a retainer mounted in the connector housing to releasibly latch the endform in the connector housing; and
an electrical contact mounted separately from the retainer in the connector housing between the housing and the endform for establishing electrical contact between an outer surface of endform and the connector housing the electrical contact including an electrically conductive annular body having an outer diameter disposing the body in contact with an inner diameter of the bore in the connector housing, and at least one radially inward extending projection carried on the body adapted to engage the male endform when the endform is mounted in the bore in the connector housing.

2. The fluid quick connector of claim 1 wherein:
the at least one projection comprises a plurality of circumferentially spaced projections.

3. The fluid quick connector of claim 2 wherein:
the plurality of circumferentially spaced projections comprises at least three projections.

4. A The fluid quick connector of claim 3 wherein the plurality of projections are equi-circumferentially spaced about an inner surface of the annular body.

5. The fluid quick connector of claim 1 wherein the annular body comprises:
an electrically conductive top bat mountable in a bore of the connector housing for holding a seal element in the bore, the top hat having an inner bore receiving the endform; and
the at least one radially inward extending projection carried on the top hat adapted to engage the endform when the endform is inserted into the bore in the connector housing.

6. The fluid quick connector of claim 5 wherein:
the at least one projection comprises a plurality of circumferentially spaced projections.

7. A The fluid quick connector of claim 6 wherein:
the plurality of circumferentially spaced projections comprises at least three projections.

8. The fluid quick connector of claim 6 wherein the plurality of projections are equi-circumferentially spaced about an inner surface of the top hat.

9. The fluid quick connector of claim 1 wherein the annular body comprises:
a spacer mounted in the bore about the endform; and
at least one radially inward extending projection carried on the spacer adapted to engage the endform when the endform is inserted into the bore in the connector housing.

10. The fluid quick connector of claim 1 further comprising:
the connector housing and the endform being electrically conductive.

11. A fluid quick connector comprising:
a connector housing configured to receive an endform;
a retainer mounted in the connector housing to releasibly latch the endform in the connector housing;
a spacer, the spacer mounted in a through bore of the connector housing between the male endform and the connector housing; and
an electrical contact member carried on the spacer for establishing electrical contact between the endform and the connector housing, the contact member including the spacer formed of an electrically conductive material, and at least one radially inward projection carried on the spacer adapted to engage the endform where the endform is mounted in the bore in the connector housing.

12. The fluid quick connector of claim 11 wherein:
the at least one projection comprises a plurality of circumferentially spaced projections.

13. The fluid quick connector of claim 12 wherein:

the plurality of circumferentially spaced projections comprises at least three projections.

14. A fluid quick connector comprising:

an electrically conductive connector housing configured to receive an electrically conductive endform a retainer mounted in the connector housing to releasibly latch the endform in the connector housing;

a top hat separate from the retainer, the top hat mountable in a bore of the connector housing for holding a seal element in the bore, the top bat receiving the endform therethrough, the top hat formed of an electrically conductive material; and an electrical contact member defining at least one radially inward extending projection carried on the top bat adapted to engage the endform when the endform is inserted into the bore in the connector housing.

15. The fluid quick connector of claim 14 wherein:

the at least one projection comprises a plurality of circumferentially spaced projections.

16. The fluid quick connector of claim 14 wherein:

the plurality of projections comprises three circumferentially spaced projections.

17. A fluid quick connector comprising:

a connector housing configured to receive an endform along a first axis;

the connector housing and the endform being electrically conductive;

a retainer mounted in the connector housing to releasibly latch the endform in the connector housing;

a spacer and a top bat disposed in a through bore in the connector housing about the endform and separate from the retainer; and an electrical contact member carried on one of the sparer and the top hat for establishing electrical contact between the endform and the connector housing, the electrical contact member including at least one of the spacer and the top hat formed of electrically conductive material, and at least one radially inward projection carried on the spacer and the top hat adapted to engage the endform where the endform is mounted in the bore in the connector housing.

18. The fluid quick connector of claim 17 wherein:

the at least one projection comprises a plurality of circumferentially spaced projections.

19. The fluid quick connector of claim 18 wherein:

the plurality of circumferentially spaced projections comprises at least three projections.

20. An electrical contact for a fluid quick connector having a connector housing configured to receive an endform latched in the housing by a retainer, the electrical contact comprising:

an electrically conductive body adapted to be disposed in a bore of a connector housing axially separate from the retainer about an endform inserted into the housing to establish electrical contact between the endform and the connector housing, the electrically conductive body having an outer diameter disposing the body in contact with an inner diameter of the bore in the connector housing, and at least one radially extending contact projection carried on the body adapted to engage the endform where the endform is mounted in the bore in the connector housing.

21. The electrical contact of claim 20, wherein:

the at least one contact projection comprises a plurality of circumferentially spaced contact projections.

22. The electrical contact of claim 21 wherein:

the plurality of circumferentially spaced contact projections comprises at least three contact projections.

23. The electrical contact of claim 21 wherein the plurality of contact projections are equi-circumferentially spaced about an inner surface of the contact body.

* * * * *